Figure 3:
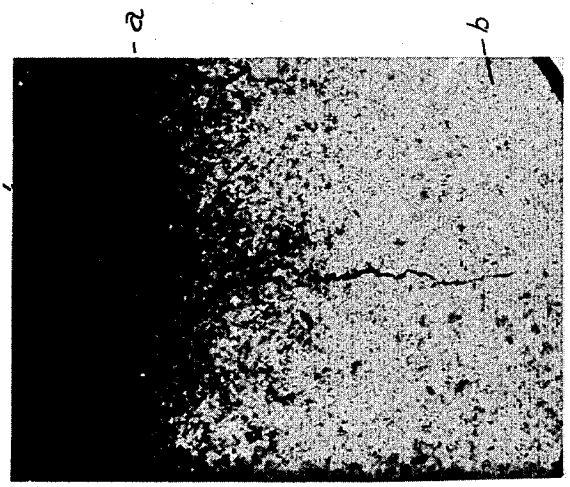

Jan. 8, 1963 P. L. E. KUNTZMANN 3,071,981
ROLLER FOR TRANSMISSION CHAIN AND THE
METHOD OF PRODUCING SAID ROLLER
Filed May 25, 1960

United States Patent Office 3,071,981
Patented Jan. 8, 1963

3,071,981
ROLLER FOR TRANSMISSION CHAIN AND THE METHOD OF PRODUCING SAID ROLLER
Paul Louis Emile Kuntzmann, Villejuif, France, assignor to Compagnie des Transmissions Mecaniques Seine-Doubs-Isere (S.E.D.I.S.), Levallois-Perret, France, a French body corporate
Filed May 25, 1960, Ser. No. 31,697
Claims priority, application France July 16, 1959
9 Claims. (Cl. 74—245)

The present invention relates to transmission chains and more particularly to their rollers and the method of producing the latter.

It is known that when a chain is engaged on a sprocket the link of the chain which comes into engagement does not have a fixed position relative to the roller but oscillates in the plane of the pinion between two extreme positions the limits of which are a function of the pitch and the number of teeth of the sprocket.

This is due to what is termed the "polygonal effect."

If $u$ represents the angular speed of rotation of the pinion, and $p$ the pitch of the chain in question, at the instant of engagement, the aforesaid movement of the link relative to the sprocket is a relative movement of angular speed $u$. Thus the various articulations of the chain come successively in contact with the teeth at a linear radial speed equal to $up$.

The outer element of the articulation, which is the roller, therefore receives a shock or blow whose intensity is proportional to the kinetic energy stored in the articulation at the moment of contact between the roller and the teeth. This consumption of energy at the moment of shock is compensated by an elastic deformation of the roller.

Further, it is known that owing to the engaging or meshing movement of the chain and consequently the relative movements of the different constituent elements, the rollers of a chain rotate about their axes, this rotation occurring always in the same direction.

It is clear from the foregoing that the rollers of a chain are, in the course of the winding of the chain round the sprockets, subject to great deforming stresses throughout their periphery.

Known chain rollers are generally either rolled from hardened and tempered medium steel, in which case they behave in the manner of a spring, or, stamped out and machined from case-hardened and tempered mild steel.

The purpose of carbon case hardening is to harden the surface superficially and thereby permit it to resist shocks. The carbon enrichment has for further purpose to lower the temperature of the martensitic transformation point of the roller periphery. At the start of the quenching of the roller, the core of the annular wall of the roller assumes its final martensitic structure, whereas the carbonized "case" still retains austenite and is therefore deformable. Subsequently, in the course of the quenching, the case itself becomes martensitic with increases in volume. Consequently, the carbonized superficial layer or case is under compressive strain which enhances the resistance to cracking during deformations due to shocks or impact.

However, when stress or fatigue phenomena in chain rollers and above all the spreading of stress or fatigue cracks are examined, it is found that the surface layer of known rollers crack relatively rapidly at the joints of the martensitic grains and this cracking thereafter spreads more or less rapidly, depending on the working conditions, along the joints of the grains. The initial crack thus plays a major part since owning to the localisation of the stresses due to the notch effect, the inital crack spreads little by little and creates an intercrystalline rupture owing to loss of cohesion between the grains.

It is, lastly, generally known in metallurgy to obtain metallic diffusions within metals or alloys either by heat treating, or by electrolytic deposit (or any other chemical means), followed by a diffusion at high temperature above that of the upper transformation point of the metal or alloy (above 950° C. in the case of steel) within which the diffusion is obtained in a neutral atmosphere to avoid oxidation of the surface deposit.

These known metallic diffusion treatments have heretobefore only been used to create superficially a layer which is not heat treated but rich in alloy element and well resistant to corrosion and wear.

The object of the present invention is to provide an improved roller for a transmission chain free from any tendency to form surface cracks subsequently capable of spreading along the joints of the martensitic grains. This roller has a grainless homogenous surface layer constituted by a true solid austenitic solution of an alloy of iron and at least another additional metal.

Preferably, the sub-jacent layer is martensitic, as known per se, and connected to the surface layer by an intermediate martensitic layer containing a proportion of the addition metal diffused in this layer.

Another object of the invention is to provide a method of producing the aforementioned chain roller which comprises, after forming the roller from steel, effecting, as known per se, a metallic diffusion of at least one addition metal starting at the surface of the roller and penetrating through a fraction of its radial thickness, thereafter effecting a hardening heat treatment to convert the iron alloy due to the diffusion into an austenitic solid solution, thereafter precipitating this solution by surface hammer hardening or cold drawing and/or aging, whereas the subjacent layers become martensitic.

In other words, the invention resides in the new industrial application of a layer of metallic diffusion to chain rollers.

As these layers are rich in alloy element, if, after having heated them to about 900° C.–950° C. they are quenched in water, they retain austenite and subsequently undergo after a relatively short period of time a structural precipitation which renders them exceedingly hard (900–1100 Vickers) while remaining homogeneous. It is, in fact, a solid solution without grain joints. During the roller deforming stresses, the homogeneity and hardness of the surface layer prevent formation of surface cracks. Now, it has been seen that the destruction of the rollers by fatigue or strain is due to the spreading of surface cracks along the joints of the martensitic grains.

Thus, the invention permits, in avoiding formation of surface cracks the ipso facto prevention of intergranular core cracks since these can no longer start. Consequently, the chain rollers of the invention stand up remarkably well to the fatigue or strain phenomena to which they are subjected in use.

Another object of the invention is to provide transmission chains having the improved rollers of the invention.

Figure 2:
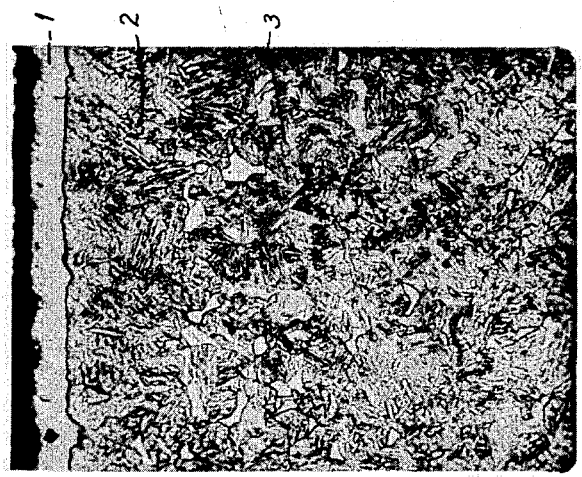
Figure 1:
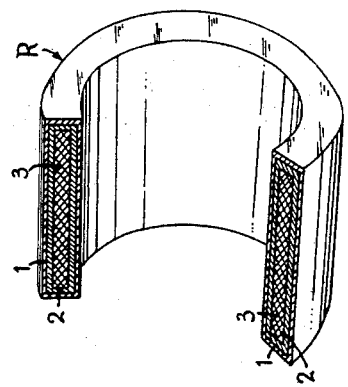

In the accompanying drawing given merely by way of example, FIG. 1 is a perspective view, with a part cut away and on a much enlarged scale, of a roller improved in accordance with the invention; FIGS. 2 and 3 are photomicrographs—obtained by nitric reagent attack (2% nitric acid in absolute alcohol) and enlarged 250 and 600 times of a part of a roller of the invention and of a conventional roller.

Whereas conventional rollers—which correspond to a cementite or carbonized surface layer or "case" $a$ covering a martensitic core $b$ are subject to intercrystalline rupture $r$ which, starting at the surface at $c$ in the form of an initial crack, spreads owing to lack of intergranular cohesion to the core $b$ and rapidly extends right through the roller, the roller R of the invention—which is shown in FIG. 1 and corresponds to the photomicrograph shown in FIG. 2—resists perfectly well the local surface stresses due to shocks without risk of the creation and spreading of cracks.

The roller of the invention comprises: a grainless homogeneous surface layer or "case" 1 constituted by an austenitic solid solution of an iron alloy and at least another addition metal such as for example manganese, silicon, boron, chromium, tungsten molybdenum, tantalum, vanadium, nickel, cobalt, zirconium; titanium; uranium, glucinium; an intermediate martensitic layer 2 containing a proportion of addition metal or metals diffused in this layer; and a martensitic subjacent layer 3 connected to the surface layer 1 by the intermediate layer 2.

By way of an example, rollers R of the invention can be obtained in the following manner:

Example

The rollers are stamped out of or machined from mild steel having the following composition by weight in addition to the iron:

| | |
|---|---|
| Carbon | 0.10–0.15 |
| Silicon | <0.25 |
| Manganese | <0.40 |
| Sulphur and phosphor | <0.035 |

They are thereafter slowly heated in a closed rotary retort with a powder having chromium (method known as chromization) and containing ferro-chromium alumina and a small proportion of halogenated ammoniacal compound (<4%).

The following mixture by weight could be used:

| | Percent |
|---|---|
| Ferro-chromium having 60% chromium | 84.5 |
| Alumina | 14 |
| Ammonium chloride | 1.5 |

The rollers are maintained in the presence of this mixture at 940° C. for a period of time varying from 1 to 2 hours.

The rollers are allowed to cool in the retort, the latter continuing to rotate. There is thus obtained a surface layer or case which is rich in chromium and is in the form of an iron-carbon-chromium alloy.

The rollers are thereafter heated in a rotary furnace at 920° C.–950° C. and then quenched in cold water—which produces an austenitic layer in the solid solution state which upon aging, undergoes a structural precipitation which could be accelerated by barreling the rollers with shot under water for 12 to 15 hours.

After this treatment, microscopic examination reveals an austenitic surface chromium-containing layer or case 1 of 10 to 15 microns which is fully homogeneous and contains 60%–70% of chromium. The hardness of this layer reaches usually 1000–1100 Vickers.

The micrograph of FIG. 2 shows on the surface the white chromium-containing and homogeneous layer 1 and, as a subjacent layer, the metal support 3 with its clearly visible crystalline orientation and its grain joints connected to the layer 1 by the intermediate layer 2.

Tests carried out have shown that rollers obtained in this way and mounted in chains, have a very distinctly longer operational life compared to rollers which have or have not been case hardened and tempered in the normal way. The life of a chain assembled with rollers treated in accordance with the invention is on average ten times longer than that of chains obtained by presently known normal production methods for high-speed chains.

Although a specific example of the invention has been described, it must be understood that the scope of the invention is in no way limited thereto.

The metallic diffusion can be effected before quenching by any method (for example heat treating, electrolytic deposit or dipping in a bath followed by a diffusion at high temperature).

The heat treatment which can be advantageously effected in a rotary retort as described, can also be effected in a box or pot.

The invention applies to all steels which assume a martensitic structure when heat treated.

The aging of the surface layer can be accelerated by hammering or work hardening.

Having now described my invention what I claim as new and desire to secure by Letters Patents is:

1. Roller of ferrous metal for transmission chain, said roller comprising on the surface a grainless homogeneous layer constituted by an austenitic solid solution of an alloy of iron and at least another addition metal, which forms with iron a homogeneous alloy, whereby it is capable of resisting intergranular fissurations and cracks due to repeated shocks.

2. Roller of ferrous metal for transmission chain, said roller, which is capable of resisting intergranular fissurations and cracks due to repeated shocks, comprising, starting from the outer surface of the roller: a grainless homogeneous outer layer constituted by an austenitic solid solution of an alloy of iron and at least another addition metal which forms with iron a homogeneous alloy, a martensitic inner layer and, located between said inner and outer layers, an intermediate martensitic layer containing some of said addition metal which has diffused into said intermediate layer.

3. Roller of ferrous metal for transmission chain, said roller, which is capable of resisting intergranular fissurations and cracks due to repeated shocks, comprising, starting from the outer surface of the roller: a surface layer constituted by an austenitic solid solution of an alloy of iron and chromium, having 60–70% of chromium by weight and a hardness of 1000–1100 Vickers, an inner martensitic layer and an intermediate martensitic layer located between said surface layer and said inner layer and containing chromium which has diffused into said intermediate layer.

4. Method of producing a roller for a transmission chain, comprising forming the roller from steel, effecting a metallic diffusion of at least an addition metal which forms with iron a homogeneous alloy in starting from the surface of the roller, and thereafter carrying out, superficially on a thickness of at least 10 microns, a hardening heat treatment to convert the alloy, containing iron due to the diffusion, into an austenitic solid solution, and thereafter precipitating said solution, whereas the subjacent layers become martensitic.

5. Transmission chain rollers of ferrous metal, resistant to intergranular fissurations and cracks due to repeated shocks, comprising, on their surface a grainless homogeneous layer constituted by an austenitic solid solution of an alloy of iron and at least another addition metal which forms with iron a homogeneous alloy.

6. Roller for transmission chain, said roller comprising on the surface a grainless homogeneous layer constituted by an austenitic solid solution of an alloy of iron and at least another alloying element selected from the group consisting of manganese, silicon, boron, chromium, tungsten, molybdenum, tantalum, vanadium, nickel, cobalt, zirconium, titanium, uranium and glucinium, whereby it is capable of resisting intergranular fissurations and cracks due to repeated shocks.

7. Method of producing a roller for a transmission chain, comprising forming the roller from steel, effecting a metallic diffusion of at least an alloying element selected from the group consisting of manganese, silicon, boron, chromium, tungsten, molybdenum, tantalum, vanadium, nickel, cobalt, zirconium, titanium, uranium and glucinium in starting from the surface of the roller, and thereafter carrying out a hardening heat treatment superficially on a thickness of at least 10 microns to convert the alloy, containing iron due to the diffusion, into an austenitic solid solution, and thereafter precipitating said solution, whereas the subjacent layers become martensitic.

8. Method of producing a roller for a transmission chain, comprising forming the roller from mild steel, effecting a metallic diffusion of an alloying element selected from the group consisting of manganese, silicon, boron, chromium, tungsten, molybdenum, tantalum, vanadium, nickel, cobalt, zirconium, titanium, uranium and glucinium, in the surface of the roller thereafter effecting a hardening heat treatment of the surface of the roller to a depth of at least 10 microns to convert the alloy containing iron due to the diffusion into an austenitic solid solution, and thereafter precipitating said solution, the part of the roller subjacent to said surface which contains the diffused alloying element becoming martensitic.

9. Method of producing a roller for a transmission chain, comprising making the roller from mild steel, chromizing the surface of the roller in a closed retort heated at about 940° C. for about 1–2 hours so as to form a surface layer in the form of an iron-carbon-chromium alloy, thereafter heating the roller in a furnace of about 920–950° C., thereafter quenching the roller in cold water so as to convert the alloy containing iron due to said diffusion into an austenitic solid solution, and thereafter precipitating said solution.

References Cited in the file of this patent
UNITED STATES PATENTS

| | | |
|---|---|---|
| 1,127,684 | Seeberger | Feb. 9, 1915 |
| 2,048,276 | Marlies et al. | July 21, 1936 |
| 2,105,048 | Lauenstein et al. | Jan. 11, 1938 |
| 2,226,403 | Hopkins | Dec. 24, 1940 |
| 2,472,320 | Vennerholm et al. | June 7, 1949 |
| 2,778,094 | Whitney | Jan. 22, 1957 |
| 2,826,496 | Kegerise | Mar. 11, 1958 |
| 2,921,877 | Samuel et al. | Jan. 19, 1960 |